United States Patent Office
3,090,986
Patented May 28, 1963

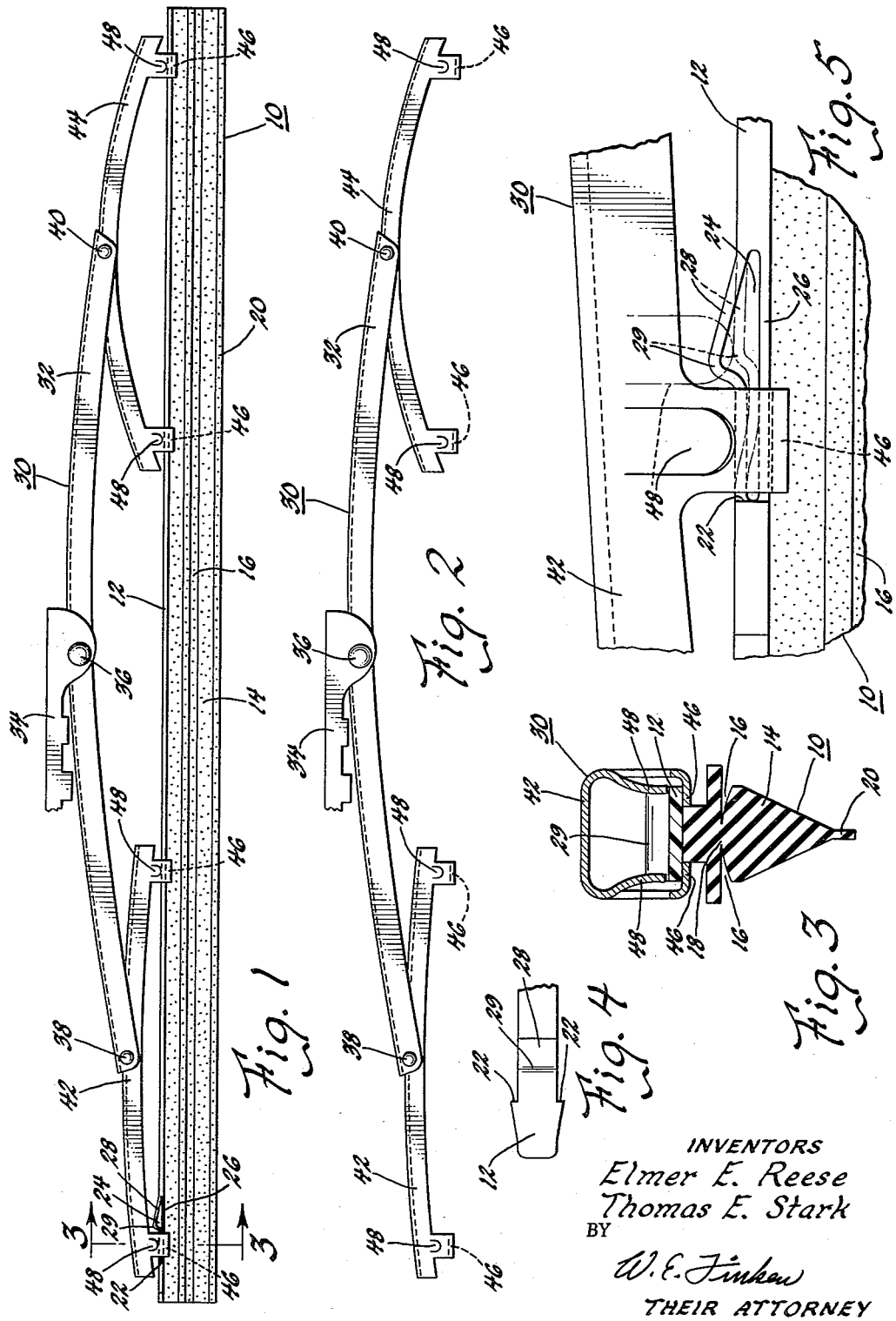

3,090,986
WINDSHIELD WIPER BLADE ASSEMBLY
Elmer E. Reese and Thomas E. Stark, Rochester, N.Y., assignors to General Motors Corporation, Detroit, Mich., a corporation of Delaware
Filed Aug. 18, 1961, Ser. No. 132,352
7 Claims. (Cl. 15—250.42)

This invention pertains to windshield wiper blade assemblies, and particularly to improved interlock means for interconnecting the squeegee unit and the pressure applying superstructure of a wiper blade assembly.

In copending application Serial No. 82,810, filed January 16, 1961, in the name of Latone and assigned to the assignee of this invention, a readily releasable interlock for connecting the squeegee unit and the pressure applying superstructure of a wiper blade assembly is disclosed wherein the retention portion of the squeegee unit is formed with notched marginal edges adjacent one end having tapering side walls extending from the notches with a slot therebetween. An end of one of the pressure applying superstructure members is adapted to be interlocked with this portion of the squeegee unit, and by compressing this portion of the squeegee unit the interlock can be released to facilitate disassembly of the squeegee unit and the pressure applying superstructure. The present invention relates to an improved readily releasable interlock wherein the retention portion of the squeegee unit includes an integral resilient latch for maintaining the squeegee unit and the pressure applying superstructure in assembled relation.

Accordingly, among our objects are the provision of readily releasable interlock means for connecting a pressure distributing superstructure and a squeegee unit of a windshield wiper assembly; the further provision of readily releasable interlock means permitting the requisite lost motion between the superstructure and the squeegee unit; and the still further provision of readily releasable interlock means between the superstructure and the squeegee unit of a wiper blade assembly including a manually releasable resilient latch integral with the retention portion of the squeegee unit.

The aforementioned and other objects are accomplished in the present invention by embodying an integral, depressible resilient latch in the retention portion of the squeegee and confining an end of a pressure applying superstructure member between the resilient latch and abutment means on the retention portion. Specifically, the squeegee may be of any type having a retainer, or retention portion, of relatively hard, resiliently flexible material. Thus, the squeegee may comprise a unitary elongate elastomeric body having strata of different hardness with at least a part of the retention portion being formed of a relative hard stratum having a greater width than thickness, and at least a part of the wiping portion being formed by a relatively soft stratum, a squeegee unit of this type being disclosed and claimed in copending application Serial No. 83,005, filed January 16, 1961, in the name of Browne et al. and assigned to the assignee of this invention. Alternatively, the squeegee may have a retention portion of a suitable plastic such as a polymerized formaldehyde, known in the trade as "Delrin," which is adhesively bonded to a rubber or rubber-like wiping body.

In either of the above described forms, the squeegee has greater flexibility in a plane normal to the surface to be wiped than in a plane parallel to such surface by virtue of the relatively greater width than thickness of the retention portion. The retention portion is formed with a pair of marginal abutments adjacent one end thereof and an integral resilient latch spaced longitudinally from the abutments. The integral resilient latch is formed by embodying an elongate transverse slot between the upper and lower surfaces of the retention portion to define spaced webs, the upper web having an upstanding tab, or latch. This structure can conveniently be formed when the retention portion of the squeegee is molded. The pressure applying superstructure can be of any type known in the art comprising a plurality of pivotally interconnected yokes or a plurality of pivotally interconnected stack levers, or a combination of yokes and levers. In the exemplary embodiment disclosed, the superstructure comprises a triple yoke linkage having a primary yoke and a pair of secondary yokes, the ends of the secondary yokes having claws adapted to straddle the marginal edges of the retention portion of the squeegee. Preferably, the claws are of the type disclosed in copending application Serial No. 83,004, filed January 16, 1961, in the name of Latone et al. and assigned to the assignee of this invention.

Thus, the pressure applying members are of channel-shaped configuration and have claws at their free ends comprising inwardly extending flanges formed adjacent their free ends and arcuate dimples, or tangs, projecting inwardly from the side walls whereby pivotal movement between the squeegee unit and the pressure applying superstructure is permitted. In order to assemble the pressure applying superstructure with the squeegee unit it is only necessary to engage the claws of the several members of the superstructure with the retention portion of the squeegee and effect relative longitudinal movement therebetween so that the end claw is confined between the marginal abutments and the integral resilient latch. In order to disassemble the superstructure and the squeegee unit, the resilient latch must be manually depressed so as to permit reverse relative longitudinal movement between the squeegee and the superstructure.

Further objects and advantages of the present invention will be apparent from the following description, reference being had to the accompanying drawing, wherein a preferred embodiment of the present invention is clearly shown.

In the drawing:

FIGURE 1 is a side elevational view of a windshield wiper blade assembly constructed according to the present invention.

FIGURE 2 is a side elevational view of a typical pressure applying superstructure assembly.

FIGURE 3 is a sectional view taken along the line 3—3 of FIGURE 1.

FIGURE 4 is a fragmentary plan view of the top of the squeegee.

FIGURE 5 is an enlarged fragmentary view, in elevation, depicting the manner of assembling the superstructure with the squeegee unit.

With particular reference to FIGURE 1, a windshield wiper blade assembly is shown comprising a squeegee 10 and a pressure distributing linkage, or superstructure, 30. The squeegee 10 includes a retention portion 12 having greater width than thickness and which is composed of relatively hard resiliently flexible material, and a relatively soft wiping body 14 having flexure grooves 16 extending longitudinally throughout its length which forms a thin neck 18. The wiping body 14 is formed with a wiping lip 20 along its free edge adapted for engagement with a surface to be wiped.

The retention portion 12 is formed with a pair of laterally projecting marginal abutments 22 adjacent the heel, or inner end, of the squeegee unit as clearly shown in FIGURE 4, and a transversely extending elongate slot 24 between the upper and lower surfaces thus defining a pair of relatively thin webs 26 and 28, as seen in FIG- URES 1 and 5. The web 28 is formed with an upstanding abutment, or projection, 29 having an inclined entrance surface and constituting a resilient latch. The resilient latch has a width equal to the width of the retention portion as clearly seen in FIGURE 4. It is pointed out that the material composing the retention portion 12 is resiliently flexible and thus will tend to maintain and regain its original shape when the deformation forces to which it is subjected are relieved. Thus, the upstanding projection 29 constituting a resilient latch can be deflected to facilitate assembly and disassembly of the pressure applying superstructure, and when released will return it to its original position as depicted in full lines in FIGURE 5.

The pressure applying superstructure as shown in FIGURES 1 and 2 comprise a channel-shaped primary yoke 32 having an arm connector 34 attached thereto by a transverse hinge pin 36. Opposite ends of the primary yoke 32 are connected by transverse hinge pins 38 and 40 to channel-shaped secondary yokes 42 and 44, respectively. The intermediate portions of the secondary yokes 42 and 44 are disposed in nesting relationship between the side walls of the primary yoke. The end of each secondary yoke is formed with a claw adapted to straddle the retention portion of the squeegee unit. Each claw structure comprises a pair of inwardly extending flanges 46 and a pair of arcuate dimples, or tangs, 48 spaced above the flanges 46 and adapted to have point contact with the upper surface of the retention portion 12. It is pointed out that the distance between the abutments 22 and the spring latch 29 is of greater longitudinal extent than the length of the flanges 46 so as to permit relative sliding movement between the superstructure and the squeegee unit at the detachable interlock therebetween. More particularly, movement of the superstructure 30 to the left relative to the squeegee unit is limited by the abutments 22 which engages the flanges 46, while movement of the superstructure to the right is limited by engagement of the tangs 48 with the spring latch 29.

In order to assembly the superstructure with the squeegee unit, it is only necessary to engage the claws of the secondary yokes in straddling relation with the marginal edges of the retention portion 12 and slide the superstructure towards the heel end of the squeegee. As the heel end of the secondary yoke 44 approaches the heel end of the squeegee, the arcuate tangs 48 will automatically deflect the resilient latch 29, as shown in dotted lines in FIGURE 5. The resilient latch 29 will inherently spring back to its initial preformed position when the heel end claw of the secondary yoke reaches the full line position of FIGURE 5.

If it becomes necessary to replace the squeegee unit, it is only necessary to manually depress the resilient latch 29 and effect the reverse longitudinal movement between the squeegee and the superstructure. More particularly, as shown in FIGURE 1, if the spring latch 29 is depressed, the pressure applying superstructure can be slid longitudinally to the right so as to completely disengage it from the squeegee.

While the embodiment of the invention as herein disclosed constitutes a preferred form, it is to be understood that other forms might be adopted.

What is claimed is as follows:

1. A windshield wiper blade assembly including, a squeegee having a relatively hard, resiliently flexible retention portion and a freely flexible wiping portion, a pressure applying superstructure engageable with said squeegee at a plurality of longitudinally spaced apart points, and readily releasable interlock means interconnecting said squeegee and said superstructure at only one of said points, said interlock means comprising laterally projecting marginal abutment means on said retention portion and an integral upstanding resilient latch having a width coextensive with said retention portion and longitudinally spaced from said abutment means such that said resilient latch is automatically depressed to engage the interlock means upon relative sliding movement between the squeegee and the superstructure, but requires manual actuation to release the same.

2. A windshield wiper blade assembly including, a squeegee having a relatively hard, resiliently flexible retention portion and a freely flexible wiping portion, a pressure applying superstructure having a plurality of relatively movable members with claws at their free ends adapted to straddle said retention portion so as to engage said squeegee at a plurality of longitudinally spaced apart points, and readily releasable interlock means interconnecting one of said claws with said retention portion, said interlock means comprising a pair of laterally projecting marginal abutments on said retention portion and an integral upstanding resilient latch having a width coextensive with said retention portion and longitudinally spaced from said abutments and adapted to retain said one claw therebetween, said resilient latch being automatically depressed by said claw to engage the interlock means upon relative sliding movement between the squeegee and the superstructure, but requiring manual actuation to release the same.

3. A windshield wiper blade assembly including, a squeegee unit comprising an elongate, resiliently flexible elastomeric body having a wiping lip along one edge, a retention portion connected to said body along its opposite edge, said retention portion having greater width than thickness so as to have greater flexibility in a plane normal to a surface to be wiped than in a plane parallel thereto, a pressure applying superstructure engageable with said squeegee at a plurality of longitudinally spaced apart points, and readily releasable interlock means interconnecting said squeegee and said superstructure at only one of said points comprising a pair of laterally projecting marginal abutments on said retention portion and an integral upstanding resilient latch having a width coextensive with said retention portion and spaced longitudinally from said abutments whereby the resilient latch will be automatically depressed to engage the interlock means upon relative sliding movement between the squeegee and the superstructure, while requiring manual actuation to release the same.

4. A squeegee for a windshield wiper blade assembly including, an elongate resiliently flexible elastomeric body having a wiping portion, a flexible retention portion connected to said body, said retention portion being of harder material than said wiping portion and having a greater width than thickness so as to have greater flexibility in a plane normal to a surface to be wiped than in a plane parallel thereto, laterally projecting marginal abutment means on said retention portion, said retention portion having a transverse elongate slot between its upper and lower surfaces adjacent said marginal abutment means defining upper and lower webs, and an integral upstanding resilient latch in said upper web having a width coextensive with said retention portion and longitudinally spaced from said abutments, said latch being adapted to interlock with a pressure applying superstructure.

5. A squeegee for a windshield wiper blade assembly including, an elongate resiliently flexible elastomeric body having a wiping portion, a flexible retention portion connected to said body, said retention portion being stiffer than said wiping portion and having a relatively wide back, a pair of laterally projecting marginal abutments on said retention portion, and an integral upstanding resilient latch having a width coextensive with said retention portion and spaced longitudinally from said abutments and adapted to interlock with a pressure applying superstructure.

6. A squeegee for a windshield wiper blade including, an elongate freely flexible elastomeric body having a wiping portion, a flexible retention portion connected to said body, said retention portion being stiffer than said wiping portion and having a relatively wide back with an elongate transverse slot therethrough defining upper and lower webs, laterally projecting marginal abutment means on said retention portion adjacent one end of said slot, and an integral upstanding resilient latch in said upper web having a width coextensive with said retention portion and adapted to interlock with a pressure applying superstructure.

7. A retainer for a flexible windshield wiper blade assembly comprising, an elongate, flat resiliently flexible member, said member having greater width than thickness so as to have greater flexibility in a plane normal to a surface to be wiped than in a plane parallel thereto, a transverse slot in said member defining upper and lower webs adjacent one end thereof, a pair of laterally projecting marginal abutments on said member adjacent one end of said slot, and an integral resilient latch in said upper web having a width coextensive with said flexible member adapted to interlock with a pressure applying superstructure.

References Cited in the file of this patent
UNITED STATES PATENTS 2,924,839     Anderson _____ Feb. 16, 1960

FOREIGN PATENTS 1,077,089     Germany _____ Mar. 3, 1960